No. 750,221.　　　　　　　　　　　　　　　　　　　　　　　　Patented January 19, 1904.

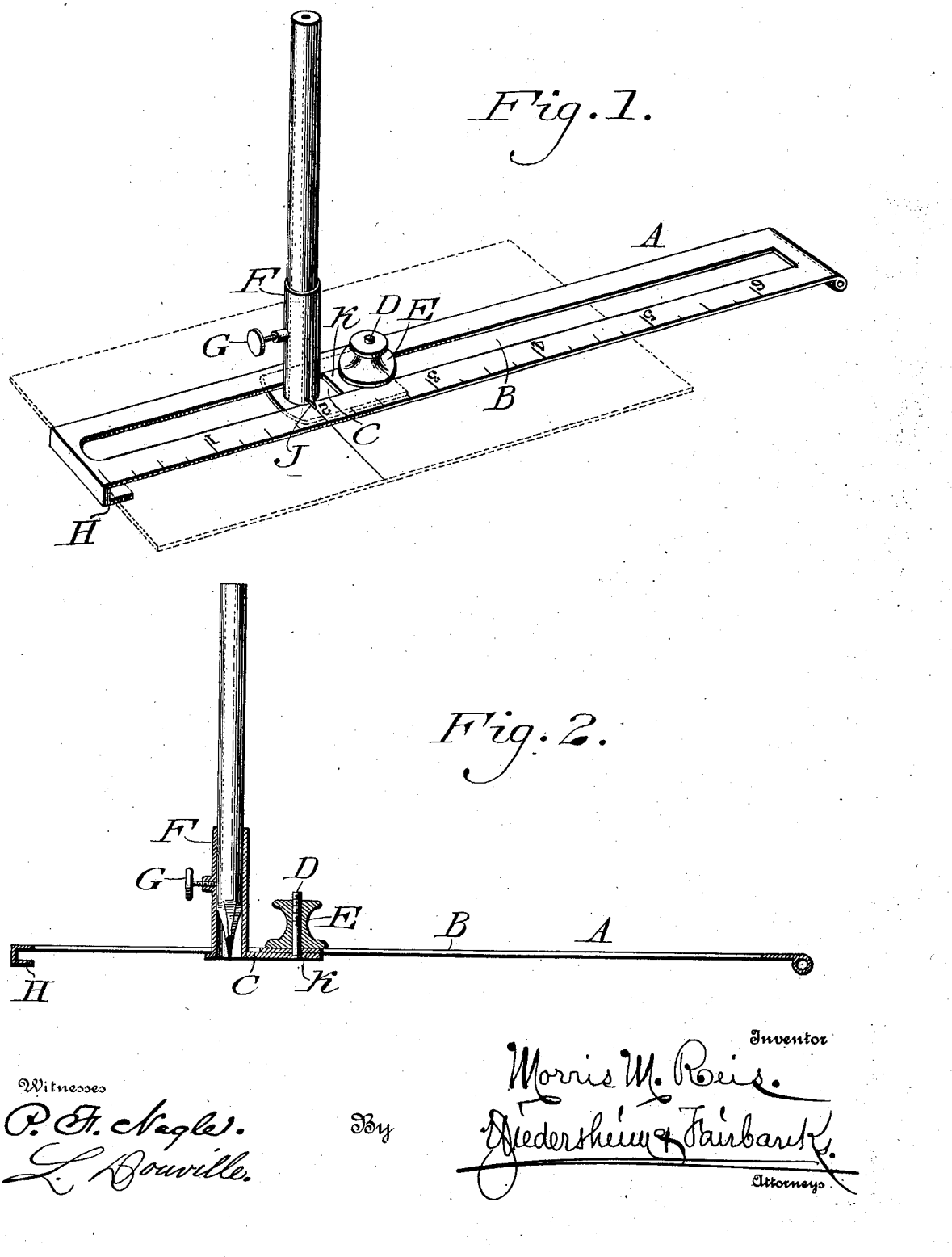

UNITED STATES PATENT OFFICE.

MORRIS M. REIS, OF PHILADELPHIA, PENNSYLVANIA, ASSIGNOR, BY MESNE ASSIGNMENTS, TO FRANKLIN M. UNDERKUFFLER, OF PHILADELPHIA, PENNSYLVANIA.

GAGE AND MARKER FOR DRESSMAKERS OR OTHERS.

SPECIFICATION forming part of Letters Patent No. 750,221, dated January 19, 1904.

Application filed March 11, 1903. Serial No. 147,288. (No model.)

*To all whom it may concern:*

Be it known that I, MORRIS M. REIS, a citizen of the United States, residing in the city and county of Philadelphia, State of Pennsylvania, have invented new and useful Improvements in Gages and Markers for Dressmakers or Others, of which the following is a specification.

My invention consists of a device adapted to mark fabric or material for dressmakers and others and to guide the device true thereover, the device embodying a graduated base-plate, a gage or guide, a carrier for a lead-pencil or other marking instrument, and means for controlling said carrier when said pencil or instrument occupies its set position, whereby the device may be moved over the fabric or material and marks made thereon in a positive, true, and uniform manner, as will be hereinafter set forth, the novel features being pointed out in the claims.

Figure 1 represents a perspective view of a gage and marker embodying my invention. Fig. 2 represents a longitudinal section thereof.

Similar letters of reference indicate corresponding parts in the figures.

Referring to the drawings, A designates a graduated plate constituting the base of the device, the same having the longitudinally-extending slot B therein.

C designates a slide or sliding plate, and D designates a screw which is connected with said slide and provided with the nut E, it being noticed that said screw passes freely through the slot B and that the slide C and nut E are on opposite sides of the base-plate A.

Rising from the slide C and carried by the same is the tube F, which passes freely through the slot B and is adapted to receive a lead-pencil or other marking device, it being provided with the screw G, which is adapted to press against said pencil or device and firmly hold the same in operative position.

One end of the plate has thereon the elbow H, the same being adapted to receive the edge of material to be marked and forming a gage whereby the device may be moved true over the fabric or material to be marked, said elbow serving to guide the device in its motion.

On the side of the tube or pencil-holder F is the index or finger J, which projects therefrom over the graduations of the plate A.

The operation is as follows: A pencil is inserted in the holder F, its point projecting downwardly sufficiently below the carrier or slide C so as to contact with the fabric or material to be marked. The nut E is loosened and the slide moved until the index J registers with a desired graduation, which in the present case is that of two inches. The plate is then placed on the fabric or material to be marked and the elbow H hooked over the edge portion of said fabric or material, whereupon the plate A is moved over said fabric or material, guided true by said elbow, while the pencil marks a line across said fabric or material. Then the device is returned to its first position and the nut loosened, when the slide, or properly the pencil-holder, is moved until index J is at another desired graduation, after which the nut is tightened and the plate moved over the fabric or material, when another mark is made upon the latter parallel with the first mark.

In order to steady the slide C in the slot B, there is connected with the former the plate K, which freely and snugly occupies said slot and is interposed between the slide and base of the nut E, it being evident that in the motions of the slide said plate travels in said slot, and so guides said slide and prevents turning or irregular motions thereof.

Having thus described my invention, what I claim as new, and desire to secure by Letters Patent, is—

1. A gage and marker comprising a base-plate, a guiding-elbow on said plate, a slide movable on said plate and engaging opposite sides thereof, means for clamping said slide on said plate, a holder for a pencil or line-marking object secured to said slide and separate means on said holder for detachably engaging said object therein.

2. A gage and marker comprising a base-plate, a guiding-elbow on said plate, a slide movable longitudinally on said plate, means for clamping said slide on said plate and a tubular pencil-holder secured to said slide substantially at a right angle with said plate.

3. A gage and marker comprising a longitudinally-slotted base-plate, a guiding-elbow on said plate, a slide movable on said plate, clamping means on said slide passing through such slot, a pencil-holder on said slide, its lower end adjacent said slot and separate clamping means on said holder adapted to engage said pencil.

4. A gage and marker comprising a graduated base-plate, a guiding-elbow, a slide movable on said plate, clamping means on said slide, a pencil-holder on said slide, a finger on said pencil-holder adjacent said graduations and separate clamping means on said pencil-holder.

MORRIS M. REIS.

Witnesses:
JOHN A. WIEDERSHEIM,
C. D. McVAY.